United States Patent [19]
Walker

[11] Patent Number: 4,827,549
[45] Date of Patent: May 9, 1989

[54] HYDRAULIC DOCK LEVELER

[75] Inventor: Edward T. Walker, Little Rock, Ark.

[73] Assignee: Dock Leveler Manufacturing, Inc., Malvern, Ark.

[21] Appl. No.: 139,591

[22] Filed: Dec. 30, 1987

[51] Int. Cl.$^4$ .......................... E01D 1/00; B65G 11/00
[52] U.S. Cl. .................................................... 14/71.7
[58] Field of Search ...................... 14/71.1, 71.3, 71.5, 14/71.7

[56] References Cited

U.S. PATENT DOCUMENTS

| | | | |
|---|---|---|---|
| 3,201,813 | 8/1965 | Le Clear | 14/71.7 |
| 3,201,814 | 8/1965 | Le Clear | 14/71.7 |
| 3,255,478 | 6/1966 | Lambert | 14/71.7 |
| 3,290,709 | 12/1966 | Whitenack, Jr. | 14/71.7 |
| 3,290,710 | 12/1966 | Whitenack, Jr. | 14/71.7 |
| 3,345,665 | 10/1967 | Anderson, Jr. | 14/71.7 |
| 3,388,413 | 6/1968 | Clarke | 14/71.7 |
| 4,010,571 | 3/1977 | McGuire et al. | 49/70 |
| 4,110,860 | 9/1978 | Neff et al. | 14/71.7 |
| 4,365,374 | 12/1982 | Bennett | 14/71.7 |
| 4,382,307 | 5/1983 | Alten | 14/71.7 |
| 4,641,388 | 2/1987 | Bennett | 14/71.7 |

FOREIGN PATENT DOCUMENTS

| | | | |
|---|---|---|---|
| 1146309 | 5/1983 | Canada | 14/71.7 |
| 2815535 | 10/1979 | Fed. Rep. of Germany | 14/71.7 |
| 2926057 | 1/1981 | Fed. Rep. of Germany | 14/71.7 |
| 2060550 | 5/1981 | United Kingdom | 14/71.3 |

Primary Examiner—Stephen J. Novosad
Assistant Examiner—John F. Letchford
Attorney, Agent, or Firm—Finnegan, Henderson, Farabow, Garrett & Dunner

[57] ABSTRACT

A hydraulic dock leveler having a pivotable main deck, a lip member pivotably connected to the main deck, and a hydraulic system for pivoting the main deck relative to an adjacent loading dock platform and for power extending and power retracting the lip member between a bridging and stored position. The hydraulic system includes valve means to hydraulically hold the lip member in a fully extended bridging position while the main deck is descending relative to the adjacent loading dock platform. When the main deck reaches its lowest level relative to the loading dock platform, the valve means moves to an open condition and the hydraulic system will simultaneously extend the main cylinder to raise the main deck and retract the lip cylinder to pivot the lip member to a stored position.

17 Claims, 7 Drawing Sheets

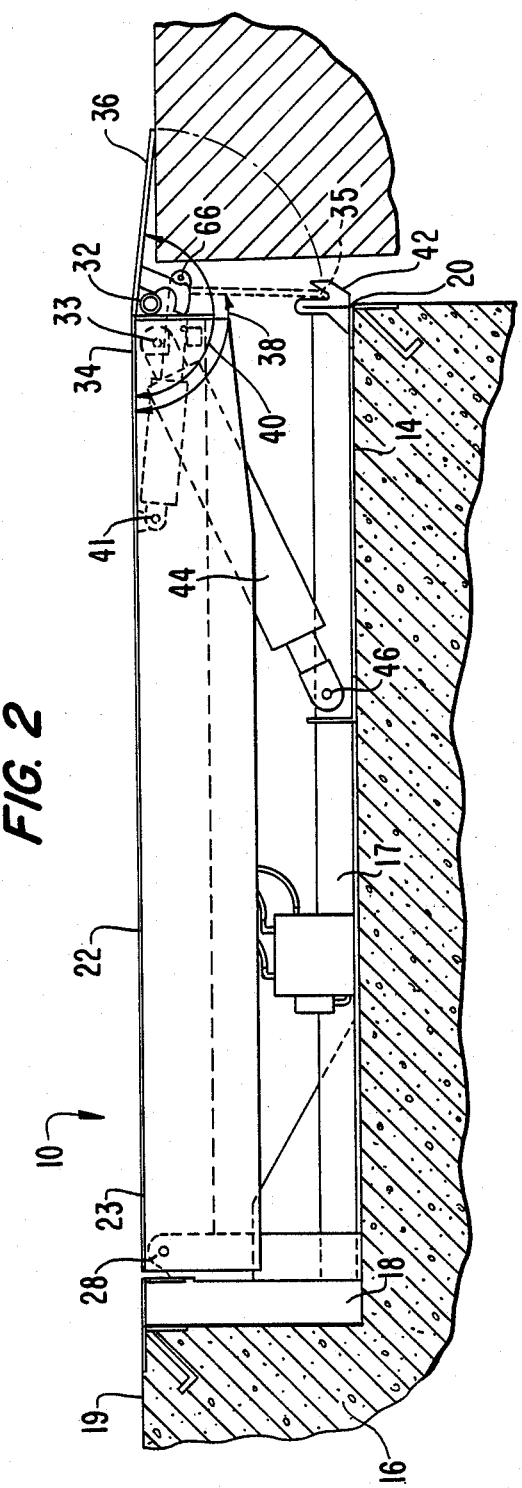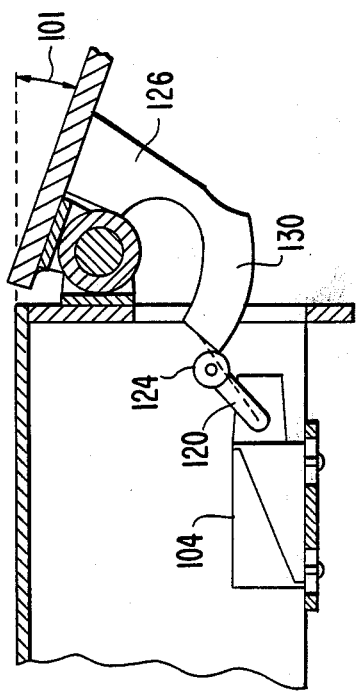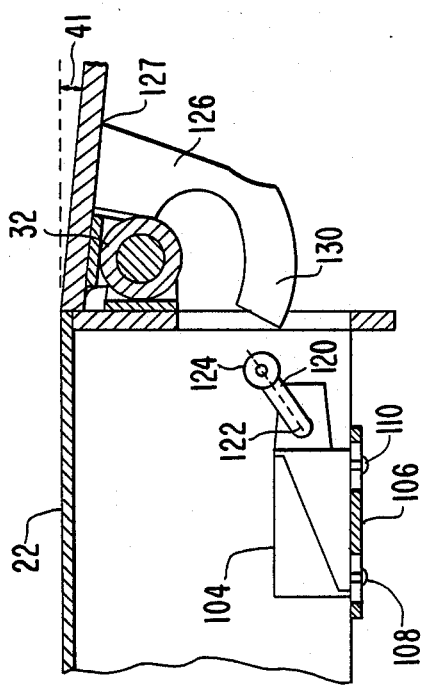

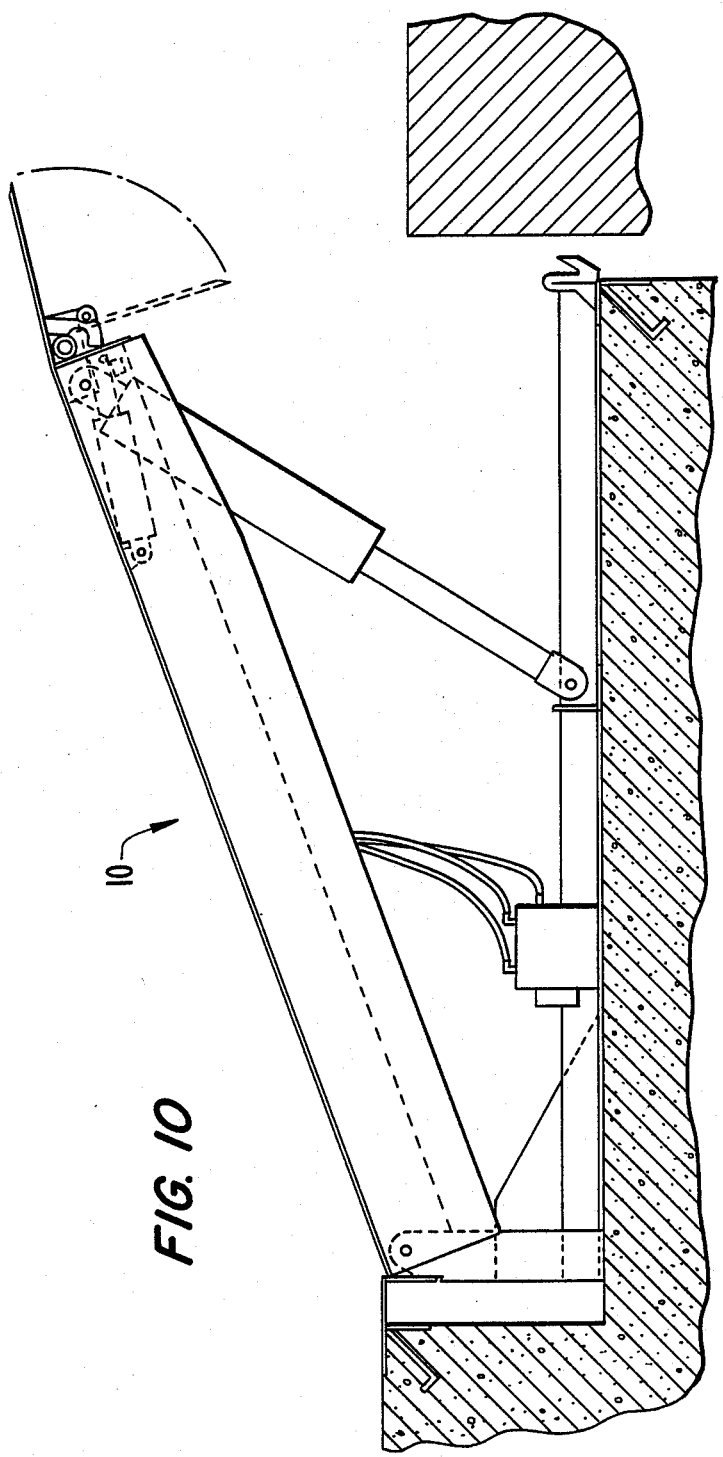
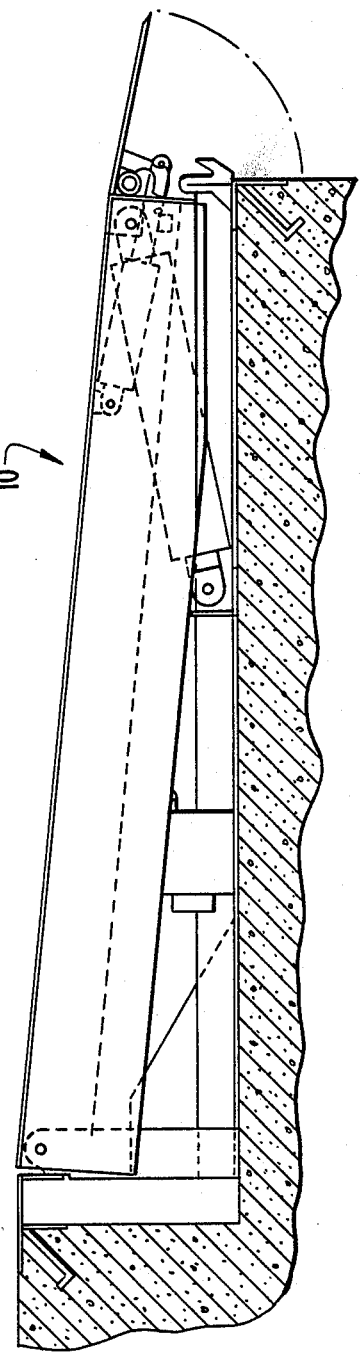
FIG. 10
FIG. 11

HYDRAULIC DOCK LEVELER

BACKGROUND OF THE INVENTION

1. Field of the Invention

This invention relates to a dock leveler which acts as a bridge between a loading dock platform and the bed of a carrier and, more particularly, to a pit-mounted hydraulic dock leveler.

2. Description of the Related Art

Dock levelers for bridging a gap between a loading dock platform and a carrier bed are in widespread use to facilitate the loading and unloading of various types of carriers. Forklift trucks are often required to move from a loading dock directly into and out of a storage compartment of a carrier. In order to facilitate such an operation, dock levelers are used to compensate for any height variation which exists between a loading dock platform and the bed of a carrier.

Typically, a dock leveler will have a main deck which pivots relative to an adjacent loading dock platform and a lip member which pivots relative to the main deck. The lip member will rest directly on the bed of a carrier when the dock leveler is positioned as a bridge and will support the main deck when the dock leveler is in the stored position. Movement of the main deck and lip member can be achieved by either mechanical means or by fluid pressure. It is a hydraulic dock leveler operating by fluid pressure to which the present invention is particularly directed.

There are two basic operational modes of a dock leveler. The first of these modes is commonly referred to as cycling. During the cycling mode, the dock leveler moves from a stored position to a bridging position for bridging the gap between a loading dock platform and the bed of a nearby carrier. The preferable stored position for a dock leveler is with the main deck extending substantially level or co-planar with an adjacent loading dock platform so that the dock leveler is in effect, an extension of the loading dock platform. When the dock leveler is in a bridging position, the lip member rests on and overlaps the bed of the carrier so that a forklift may move directly from a loading dock platform across the main deck and over the lip member directly into the storage compartment of a carrier.

The second operational mode of a dock leveler is commonly referred to as recycling. During the recycling mode, the dock leveler moves from the bridging position to the stored position.

The speed with which a dock leveler cycles and recycles is a critical factor affecting the volume of material which can be loaded or unloaded from a loading dock during any given time period. In a busy environment such as a loading dock, increased speed in recycling and cycling a dock leveler directly translates into increased profitability for a company. Accordingly, dock levelers with higher speeds of operation are constantly in demand.

Aside from relatively low speeds of operation, a second problem encountered in prior art hydraulic dock levelers involves pivoting the lip member from the bridging position to the stored position to support the main deck at a selective level relative to the loading dock platform. The generally accepted method of moving the lip member from the bridging position to the stored position is to drain the hydraulic fluid from the lip cylinder while the lip member is resting on the carrier bed. The lip member will then drop by gravity to its stored position after the carrier on which the lip member is resting departs. Such a system is disclosed in U.S. Pat. No. 3,345,665. However, many operational problems are created by relying on gravity to move a lip member to the stored position.

Typically, a lip member in a stored position will form an angle less than 90° with the main deck. In other words, the lip member pivots past a perpendicular plane relative to the main deck to reach its stored position and engage keepers provided on the frame of the dock leveler. Relying solely on gravity to move the lip member past a perpendicular plane relative to the main deck creates a serious operational problem because there is no force to hold the lip member in its stored position. Often, the lip member will swing downward under the force of gravity to its stored position and then swing outwardly to a position were it will not engage the keepers.

A second problem associated with relying on gravity to move the lip member to the stored position occurs when the hinge which pivotally connects the lip member to the main deck is damaged. Such damage can occur from trucks backing into the hinge while maneuvering close to the loading dock or can result from unfavorable climatic conditions since the hinge is susceptible to outside weather conditions. A damaged hinge will slow the descent of the lip member to its stored position. Further, a damaged hinge may prevent a lip member pivoting solely under the power of gravity from reaching its stored position.

SUMMARY OF THE INVENTION

Accordingly, it is a primary object of this invention to provide a hydraulic dock leveler which hydraulically retracts the lip member from the bridging position to the stored position.

It is a further object of this invention to provide a dock leveler with increased speeds of operation in both the cycling and recycling modes.

It is still a further object of this invention to provide a hydraulic system for a dock leveler which can withstand and effectively operate in the conditions commonly found in a loading dock operation.

It is yet another object of the present invention to provide a valve which closes to hydraulically hold the lip member in the bridging position and which opens to allow the lip member to be hydraulically retracted.

To achieve the foregoing objects and in accordance with the purpose of the invention as embodied and broadly described herein, the dock leveler of this invention comprises a frame having a first end to be disposed adjacent a loading dock platform and a second opposite end spaced outwardly from the first end. A main deck is provided having a first edge pivotally connected to the first end of the frame to pivot the main deck relative to the plane of a loading dock platform for positioning the second edge of the main deck at a selected height relative to the loading dock platform. A lip member is further provided having a first edge pivotably connected to the second edge of the main deck for pivoting the lip member between a bridging position for engaging the carrier bed and a stored position for supporting the main deck at a selected level relative to the loading dock platform. Hydraulic means are further provided for pivotably positioning the main deck relative to the loading dock platform and to pivot the lip member between the bridging and stored positions, the hydraulic means being operative to power retract the lip member from the bridging position to the stored position. Control means are included for operating the hydraulic means.

Further in accordance with the present invention, there is provided a hydraulic system for a dock leveler which acts as a bridge between a loading dock platform and a carrier bed. The dock leveler includes a pivotably positionable main deck and a pivotably positionable lip member. The hydraulic system comprises a main cylinder assembly for pivoting the main deck relative to the loading dock platform, a lip cylinder assembly for hydraulically pivoting a lip member between a bridging position and a stored position, and hydraulic means for operating the main and lip cylinder assemblies. The hydraulic means are operative to power extend and power retract the lip cylinder assembly.

Still further in accordance with the present invention, there is provided a valve for a hydraulic system. The valve includes a housing having an internal bore, a pilot port, a pressure port, and a tank port. The valve further includes spring means disposed in the internal bore and a valve spool slidably engaged in the internal bore and supported by the spring means for urging the valve spool to an open condition and allowing fluid flow from the pressure port to the tank port. The valve spool is operative to a closed condition for blocking fluid flow through the pressure port and the tank port at times when a predetermined pressure is applied through the pilot port.

The accompanying drawings, which are incorporated in and constitute a part of this specification, illustrate one embodiment of the invention and together with the description, serve to explain the principles of this invention.

BRIEF DESCRIPTION OF THE DRAWINGS

FIG. 2 is a sectional side view illustrating the dock leveler shown in FIG. 1 in a bridging and stored position;

FIGS. 5-9 are sequential diagrams illustrating the operation of a switch member and cam member comprising a portion of the control system of the dock leveler shown in FIG. 1;

FIG. 10 is a sectional side view illustrating various positions of the main deck and lip member during a cycling operation;

FIG. 11 is a sectional side view illustrating various positions of a main deck and lip member during a recycling operation

DESCRIPTION OF THE PREFERRED EMBODIMENT

Figure 1:
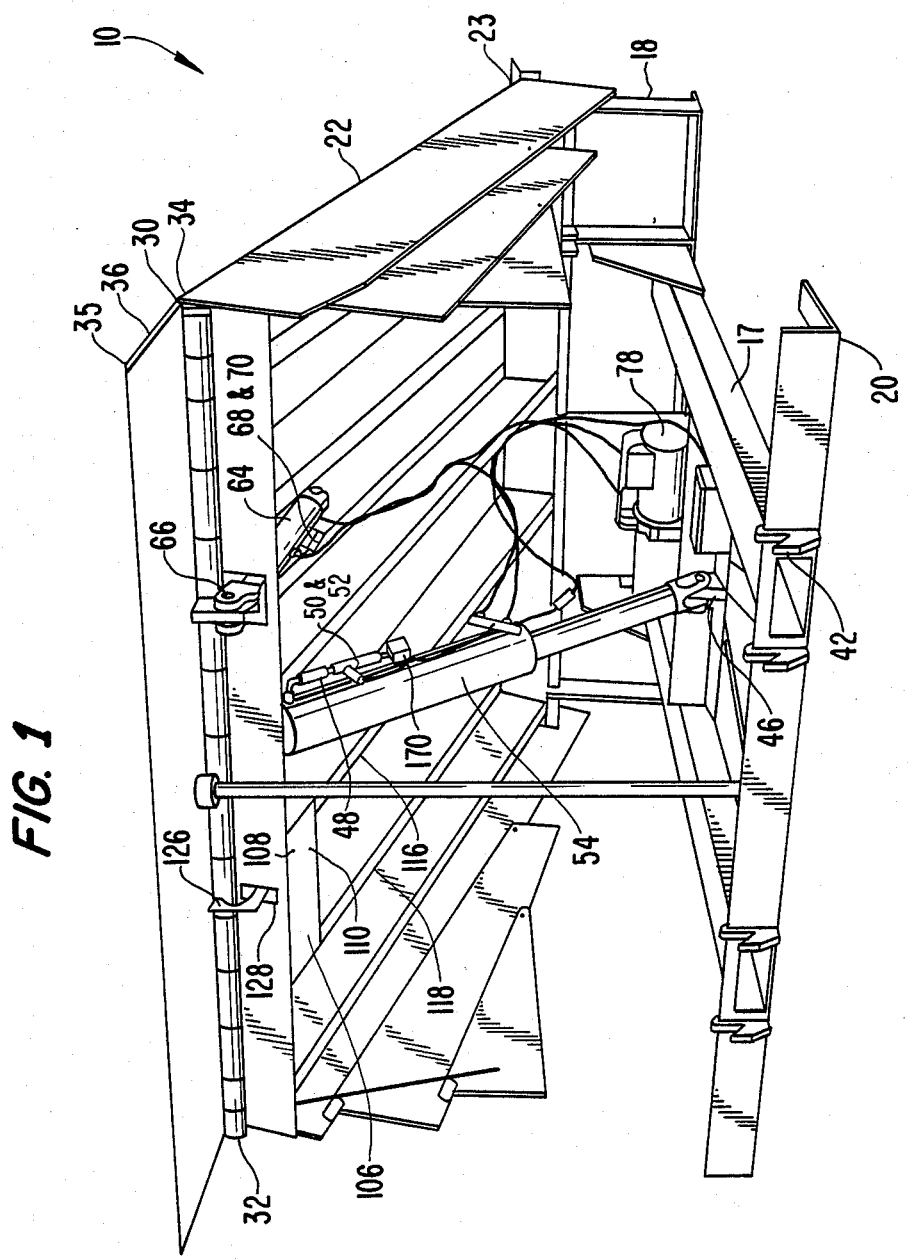
FIG. 1 is a perspective view of a dock leveler made in accord with the present invention.

The preferred embodiment of the dock leveler of the present invention is shown in FIGS. 1 and 2 and is represented generally by the numeral 10. Referring now to FIG. 2, it can be seen that dock leveler 10 is adapted to be located within a pit 14 provided in a loading dock 16 to bridge the gap between loading dock platform 19 and carrier bed 26.

In accordance with the present invention, the dock leveler includes a frame having a first end to be disposed adjacent a loading dock platform and a second opposite end spaced outwardly from the first end. As embodied herein, dock leveler 10 includes a frame 17 adapted to be disposed within a pit 14 provided n loading dock 16. Frame 17 has a first end 18 to be disposed adjacent loading dock platform 19 and a second opposite end 20 spaced outwardly from first end 18.

In accordance with the present invention, the dock leveler includes a main deck having first and second opposite edges. The first edge is pivotably connected to the first end of the frame to pivot the main deck relative to the plane of the loading dock platform for positioning the second edge of the main deck at a selected height relative to the loading dock platform. As embodied herein, dock leveler 10 includes a main deck 22 having a substantially planar upper surface over which a forklift truck or the like may move during unloading or loading of a carrier 26. A first edge 23 of main deck 22 is pivotably connected to frame 17 by a hinge bracket 28 mounted on the underside of the main deck 22 and the upper portion of frame 17. Main deck 22 can be pivoted along hinge bracket 28 to form an inclined surface relative to loading dock platform 19 and to position a second end 34 of main deck 22 at a selected height relative to loading dock platform 19.

In accordance with the present invention, the dock leveler includes a lip member having first and second opposite edges. The first edge of the lip member is pivotably connected to the second edge of the main deck for pivoting the lip member between a bridging position for engaging the carrier bed and a stored position for supporting the main deck at a selected level relative to the loading dock platform. As embodied herein, dock leveler 10 includes an extension plate or lip member 36 which is hingedly connected at a first edge 30 by hinge 32 to second edge 34 of main deck 22. Lip member 36 is adapted to move between a fully retracted stored position shown in FIG. 2 by dotted lines in which it is substantially normal to main deck 22 to a fully extended bridging position shown by solid lines in FIG. 2 in which lip member 36 forms a substantially 180° angle 40 with main deck 22. As embodied herein, the substantially normal angle 38 of lip member 36 with main deck 22 is 82° and the substantially 180° angle 40 is 172°.

Preferably, the length of lip member 36 is substantially coextensive with the second edge 34 of main deck 22. When lip member 36 is in a fully retracted stored position, i.e., substantially normal to main deck 22, a second edge 35 of lip member 36 will rest in keepers 42 provided on the second end 20 of frame 17. This arrangement is illustrated by dotted lines in FIG. 2. When lip member 36 is in a fully extended ridging position, it will rest on the bed 26 of a carrier which is being unloaded or loaded. This arrangement allows a forklift to move between deck member 22 and the bed of an adjacent carrier 26 and is illustrated by solid lines in FIG. 2.

Further, in accordance with the present invention, the dock leveler includes hydraulic means for pivotably positioning the main deck relative to the loading dock platform and for pivoting the lip member between the bridging and stored positions. The hydraulic means is operative to hydraulically retract the lip member from the bridging position to the stored position. As embodied herein, dock leveler 10 includes hydraulic means for pivotably positioning main deck 22 relative to loading dock platform 19 and for pivoting lip a member 36 between a bridging position and a stored position. The hydraulic means includes a hydraulic main cylinder assembly 44 which is pivotably connected at one end to the underside of the main deck 22 by lug 33 and at the other end is pivotably connected to frame 17 by lug 46. The main hydraulic cylinder assembly 44 includes velocity fuse valve 48, needle valve 50, check valve 52, and main hydraulic cylinder 54 which is preferably mounted with the blind end 56 adjacent the main deck 22 and the rod end 58 pivotably connected to lug 46. The inverted mounting of main hydraulic cylinder 54 creates a natural reservoir in the blind end 56 thereof. Main hydraulic cylinder 54 is a double acting cylinder having inlet ports 60, 62 on the blind and rod ends 56, 58, respectively, so that main hydraulic cylinder 54 can be differentially driven, i.e., equal pressure can be applied through ports 60, 62 on both sides of the piston 59.

As embodied herein, the hydraulic means further includes a hydraulic lip cylinder assembly 64 pivotably connected adjacent the underside of the main deck 22 at one end by lug 41 and pivotably connected at the other end to lip member 36 by lug 66. The hydraulic lip cylinder assembly 64 includes needle valve 68, check valve 70, and hydraulic lip cylinder 72 which is preferably a double acting cylinder having inlet ports 74, 76 on the blind and rod ends 75, 77, respectively, so that lip cylinder 72 can be differentially driven. Such an arrangement allows lip cylinder 72 to be power retracted and power extended.

Figure 3:
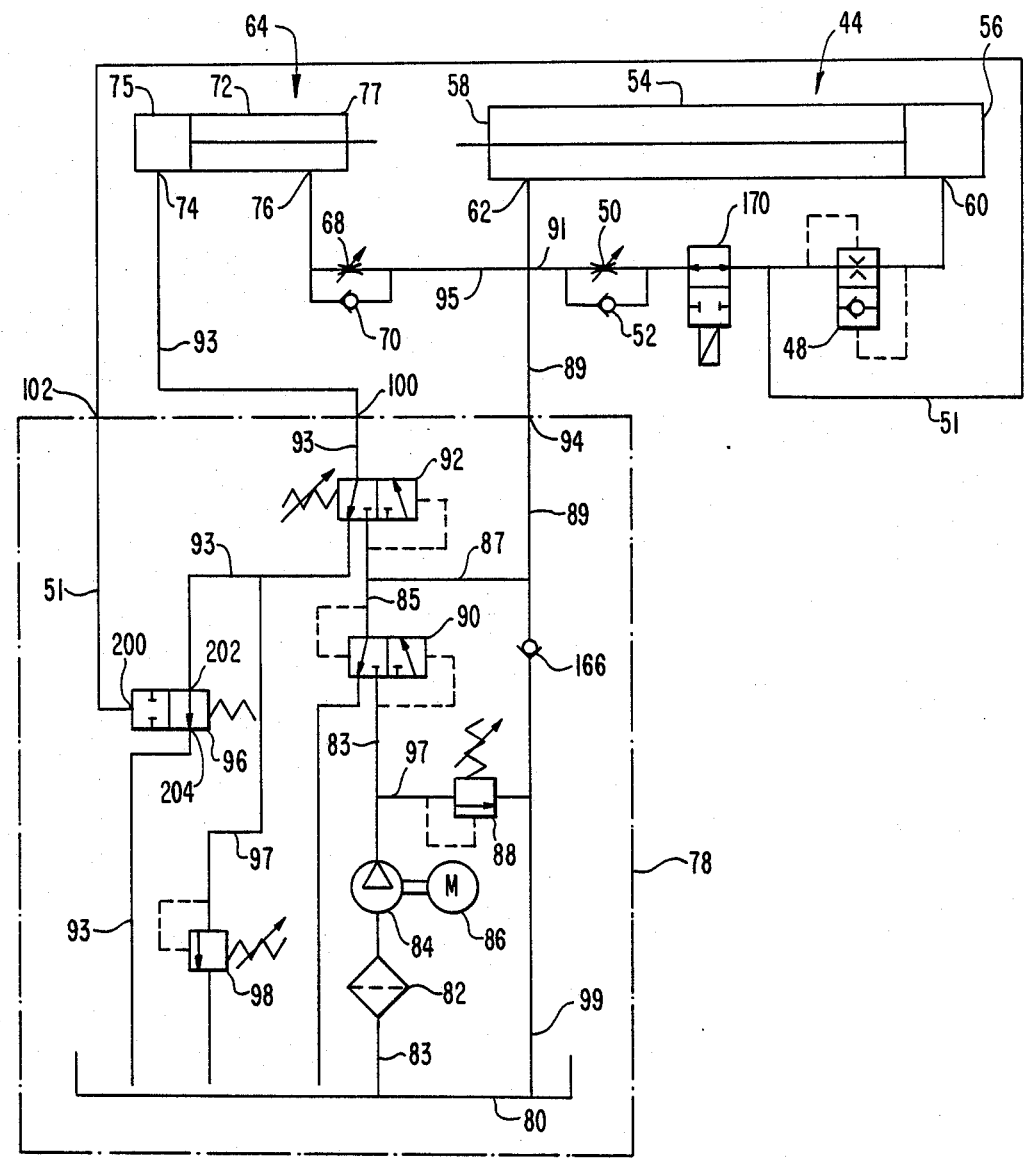
FIG. 3 is a schematic diagram of the hydraulic system of a dock leveler made in accordance with the present invention.

As embodied herein, the hydraulic means further includes hydraulic system 78 to operate the main and lip hydraulic cylinder assemblies 44, 64, respectively. With reference to FIG. 3, hydraulic system 78 includes a reservoir 80, a filter 82, a pump 84, a pump motor 86, a primary relief valve 88, a shuttle valve 90, a primary sequence valve 92, a port 94, a secondary sequence valve 96, a secondary relief valve 98, a port 100, and a port 102.

Figure 13:
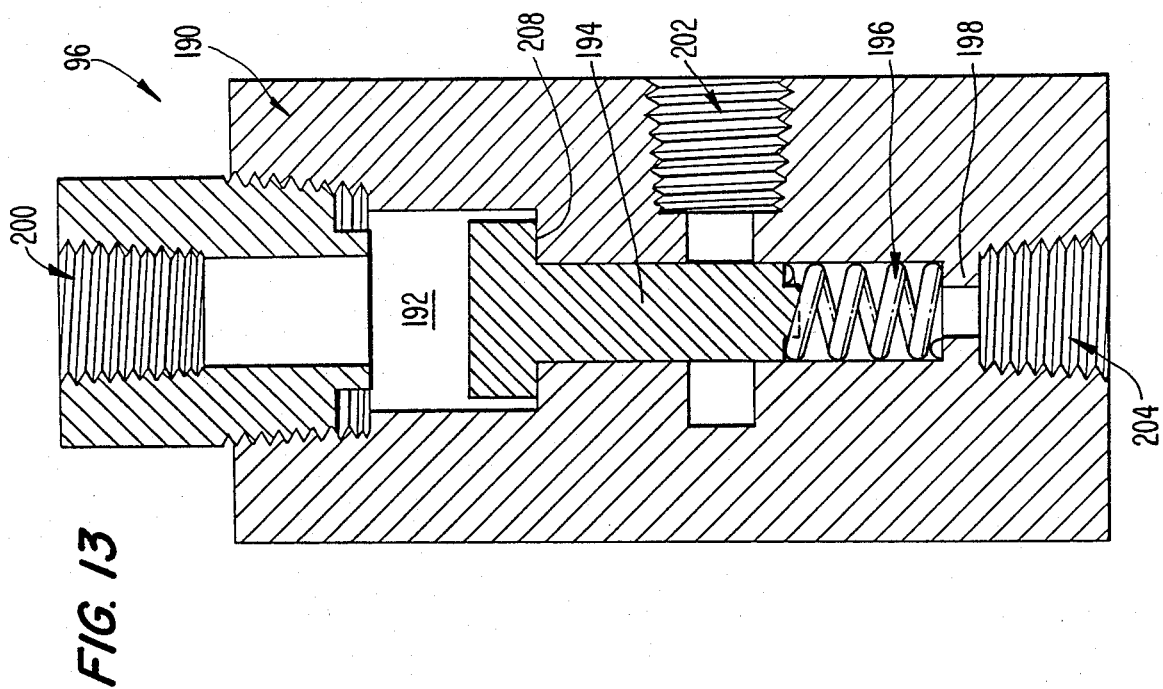
FIG. 13 is a vertical section of a closed secondary sequence valve used in the hydraulic system shown in FIG. 3.
Figure 12:
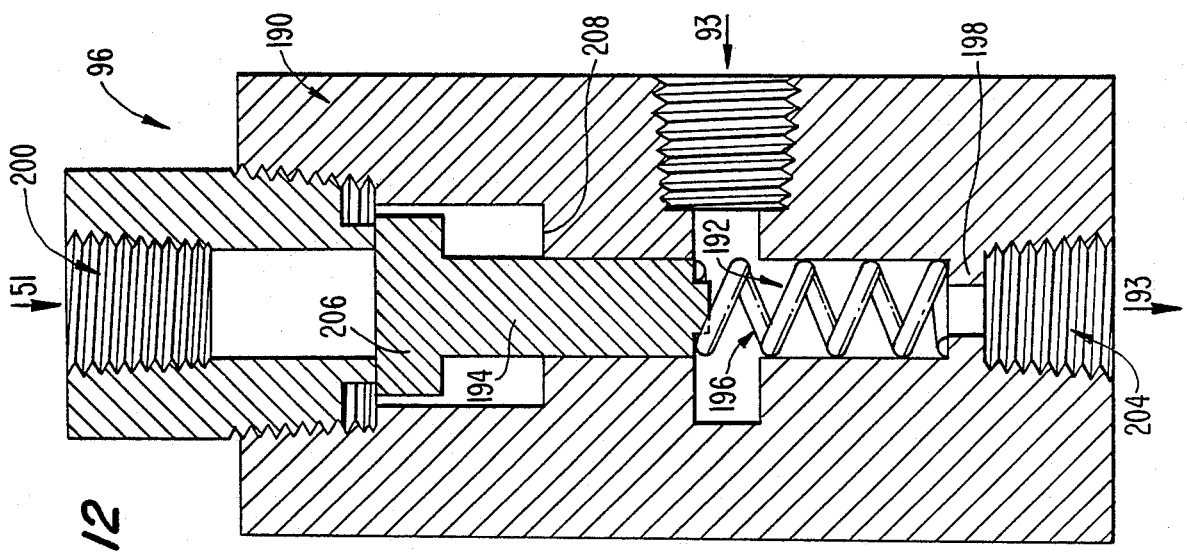
FIG. 12 is a vertical section of an open secondary sequence valve used in the hydraulic system shown in FIG. 3.

Secondary sequence valve 96 is a normally open, externally piloted-to-close two-way spool valve. With reference to FIGS. 12 and 13, secondary sequence valve 96 includes a housing 190 having an internal bore 192 in which a valve spool 194 is slidably engaged. The bottom end of valve spool 194 rests on and is supported by spring 196 for urging valve spool 194 to the open condition shown in FIG. 12. Spring 196 is supported in internal bore 192 by the sidewalls thereof and by shoulders 198. According to the preferred embodiment of the present invention, housing 190 includes a pilot port 200, a pressure port 202, and a tank port 204. Further, valve spool 194 includes a hat 206, i.e., an area of increased diameter, at the end adjacent pilot port 200 to act as a mechanical stop. When a pressure is applied through pilot port 200 which exceeds the spring force of spring 196, valve spool 194 will move downward until hat 206 abuts an internal area of the housing designated generally by numeral 208. This closed condition is shown in FIG. 13. As can be seen from FIG. 13, fluid flow through pressure port 202 and tank port 204 is blocked when valve spool 194 is in its closed condition. As embodied herein, a pressure of approximtely 40 psi is applied through pilot line 51 and pilot port 200 to move valve spool 194 to its closed condition. The fluid pressure from line 93 which enters pressure port 202 is radially applied to valve spool 194 and can be as high as 4000 psi while still requiring a pilot pressure of only 40 psi to move valve spool 194 to its closed position. A valve 96 as described and shown in FIGS. 12 and 13 is manufactured by MTE Hydraulics, Inc. as Model No. 2700-2078.

All other components of hydraulic system 78 and main and lip cylinder assemblies 44, 64, respectively, are conventional parts and are universally available through a number of manufacturers. Operation of hydraulic system 78 and main and lip cylinder assemblies 44, 64, respectively, will be described hereinafter with reference to the operation of dock leveler 10.

In the depicted preferred embodiment of dock leveler 10, the hydraulic means includes several safety features. Secondary relief valve 98 allows fluid to flow to reservoir 80 to prevent damage to any portion of hydraulic system 78 or hydraulic lip assembly 64 if lip member 36 is impacted by a truck when it is in the bridging position. Secondary relief valve 98 is a spring loaded valve normally in a closed position as shown in FIG. 3. An impact on lip member 36 will increase pressure in lines 93 and 97 and overcome the spring force of secondary relief valve 98 moving it to an open position.

Additionally, check valve 166 prevents cavitation of main cylinder 54 due to cyclic bounce of the bed of a carrier 26 during rollover of a forklift. Both check valve 166 and the inverted mounting of main cylinder 54 prevent violent drops of main deck 22 if a carrier 26 prematurely departs. As an added safety feature, velocity fuse valve 48 is included in main hydraulic cylinder assembly 44. When a specified flow rate is exceeded in velocity fuse valve 48, main cylinder 54 will lock and act as a column to support main deck 22.

In accordance with the present invention, the dock lever includes control means for operating the hydraulic means. As embodied herein and with reference to FIG. 4, the control means of dock leveler 10 includes a control system designated generally as 129 which has switch means responsive to the position of lip member 36 for activating the hydraulic means to pivot main deck 22 relative to loading dock platform 19 and to pivot lip member 36 into a fully retracted stored position to form a substantially normal angle 38 with main deck 22. The switch means is also responsive to the position of lip member 36 for de-activating the hydraulic means when lip member 36 is in the fully retracted position for supporting the second edge 34 of main deck 22 at a selected level relative to an adjacent loading dock platform 19. The selected level is substantially level or co-planar with loading dock platform 19 and main deck 22 is supported by the second edge 35 of lip member 36 resting in keepers 42 provided on the second end 20 of frame 16. Such an arrangement is referred to as the stored position and is illustrated by dotted lines in FIG. 2.

As embodied herein and as illustrated in FIGS. 5-9, the switch means includes a switch 104 slidably mounted adjacent the underside of main deck 22. Preferably, switch 104 is mounted on mounting plate 106 to support beams 116, 118 by screws 108, 110. A commercial switch such as that manufactured by Allen-Bradley Co., Inc. as Model No. 802T-A2P can be used.

As embodied herein, the switch means of the present invention further includes an operating arm 120 pivotably mounted at a first end 122 to switch 104 by a knurled shaft and nut (not shown). Operating arm 120 has a free end 124 having a curved surface. A commercial operating arm such as that manufactured by Allen-Bradley Co., Inc. as Model No. 802T-W1C can be used. The operating arm 120 is spring biased to return to a neutral position shown by dotted lines in FIGS. 5-9.

As embodied herein, the control means further includes cam means including a cam 126 connected at one end 127 to the underside of lip member 36 and extending through an opening 128 in frame 17. Cam 126 has a curved free end 130 for engaging operating arm free end 124 during a selected range of pivotal movement of lip member 36.

In order to obtain a more detailed understanding of the switch means and cam means of the present preferred embodiment of the invention, reference will now be made to the sequence of operation depicted in FIGS. 5-9.

FIG. 5 illustrates the lip member in a fully extended bridging position in which it extends substantially at 180° from main deck 22. Lip member 36 is actually at an angle less than 180° due to the limited range of motion of hinge 32. As embodied herein, angle 41 is approximately 8° so that lip member 36 forms approximately a 172° angle 40 with main deck 22. The dotted line in FIG. 6 depicts the neutral position of operating arm 120 in which switch 104 is in an open position and the hydraulic means are de-activated.

FIG. 6 illustrates lip member at a second angular position relative to the plane of main deck 22, the second angular position being intermediate the bridging and stored positions. In a preferred embodiment of the present invention, lip member 36 forms approximately a 15° angle 101 with the plane of main deck 22 in the second angular position. In this second angular position, the free end 130 of cam 126 engages operating arm free end 124 moving operating arm 120 in a counterclockwise direction. Operating arm 120 is mounted to switch 104 in such a manner that movement of operating arm 120 in a counterclockwise direction closes the contacts (not shown) of switch 104 and moves the switch 104 to a closed position. As will be more fully described hereinafter, the closure of switch 104 activates the hydraulic means to pivot main deck 22 relative to loading dock platform 19 and to pivot lip member 36 in the direction shown by an arrow in FIG. 6. It should be noted that movement of operating arm 120 in the clockwise direction has no effect on switch 104.

Figure 7:
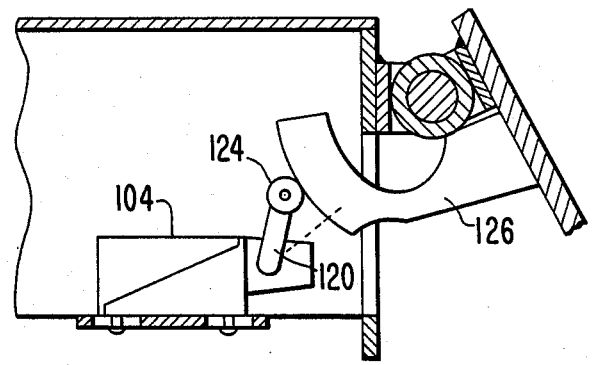
Figure 8:
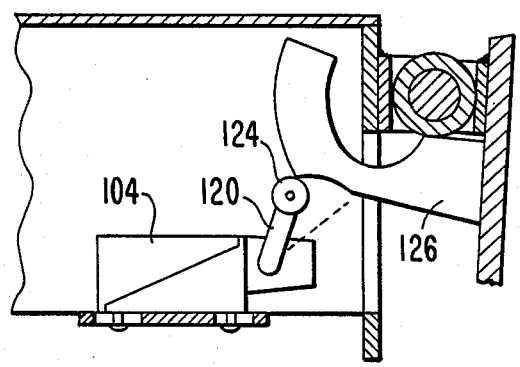

FIG. 7 illustrates the position of operating arm 120 as it is further rotated counterclockwise by continued pivotal movement of lip member 36 in the direction indicated by the arrow in FIG. 7. During the sequence of operation illustrated in FIG. 7, switch 104 remains closed due to the counterclockwise movement of operating arm 120 relative to the neutral position shown by dotted lines. FIG. 8 illustrates the arrangement of operating arm 120 and cam 126 at a point just prior to lip member 36 reaching its fully retracted position.

Figure 9:
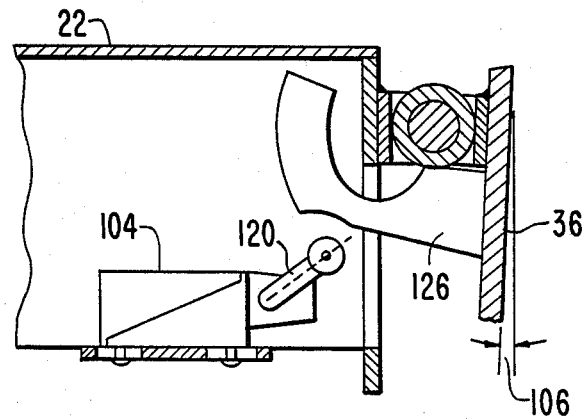

FIG. 9 illustrates the positions of operating arm 120 and cam member 126 when lip member 36 is in its fully retracted position. Operating arm 120 has rolled off cam surface 130 and returned to its neutral position (shown by dotted lines) thereby opening switch 104 and de-activating the hydraulic means. In the position shown in FIG. 9, lip member 36 is at an angle 106 just past vertical so that it is substantially normal to the plane of main deck 22. In the preferred embodiment of the present invention, angle 106 is approximately 8°.

According to the preferred embodiment of the present invention, the position of switch 104 and operating arm 120 can be adjusted relative to cam 126 to compensate for wear on the free ends 124, 130, respectively, of operating arm 120 and cam 130 and to compensate for a change in the range of pivotal motion of lip member 36 due to wear on hinge 32. As embodied herein, switch 104 and operating arm 120 are slidably mounted in slots (not shown) of mounting plate 106. Manual adjustment of switch 104 and operating arm 120 is achieved by loosening screws 108, 110, rotating operating arm 120 counterclockwise the maximum distance and sliding switch 104 and operating arm 120 toward lip member 36 in the slots (not shown) provided on mounting plate 106 while lip member 36 is in the fully retracted position shown in FIG. 9. Operating arm 120 should then be released and switch 104 and operating arm 120 should then be slowly moved in a direction away from lip member 36 until operating arm 120 is in the position shown in FIG. 8. Then, switch 104 and operating arm 120 should be gently moved approximately 1/16 of an inch until operating arm 120 slides off cam 126. Screws 108, 110 can then be tightened and the switch 104 and operating arm 120 will be in the desired position.

In the present preferred embodiment, it is found preferable that the control system is operative in a first condition to control the hydraulic means for pivoting the main deck and lip member in first directions to position the main deck and lip member in respective first positions to bridge the gap between the loading dock platform and a carrier bed positioned beneath the lip member. The control system is operative in a second condition for controlling the hydraulic means for pivotably positioning the main deck and lip member from the respective first positions to respective second positions wherein the lip member is at a selected angle relative to the main deck for supporting the main deck at a predetermined level relative to the loading dock platform As embodied herein, control system 129 of dock lever 10 is operative in a first condition to control the hydraulic means for pivoting main deck 22 and lip member 36 in first directions to respective first positions to bridge a gap between loading dock platform 19 and the bed of a nearby carrier 26 The control system 129 of dock leveler 10 is operative in a second condition for controlling the hydraulic means for pivotably positioning main deck 22 and lip member 36 from respective first positions to respective second positions wherein lip member 36 is at a substantially normal angle 38 relative to main deck 22 for supporting main deck 22 at a pre-determined level relative o loading dock platform 19.

Figure 4:
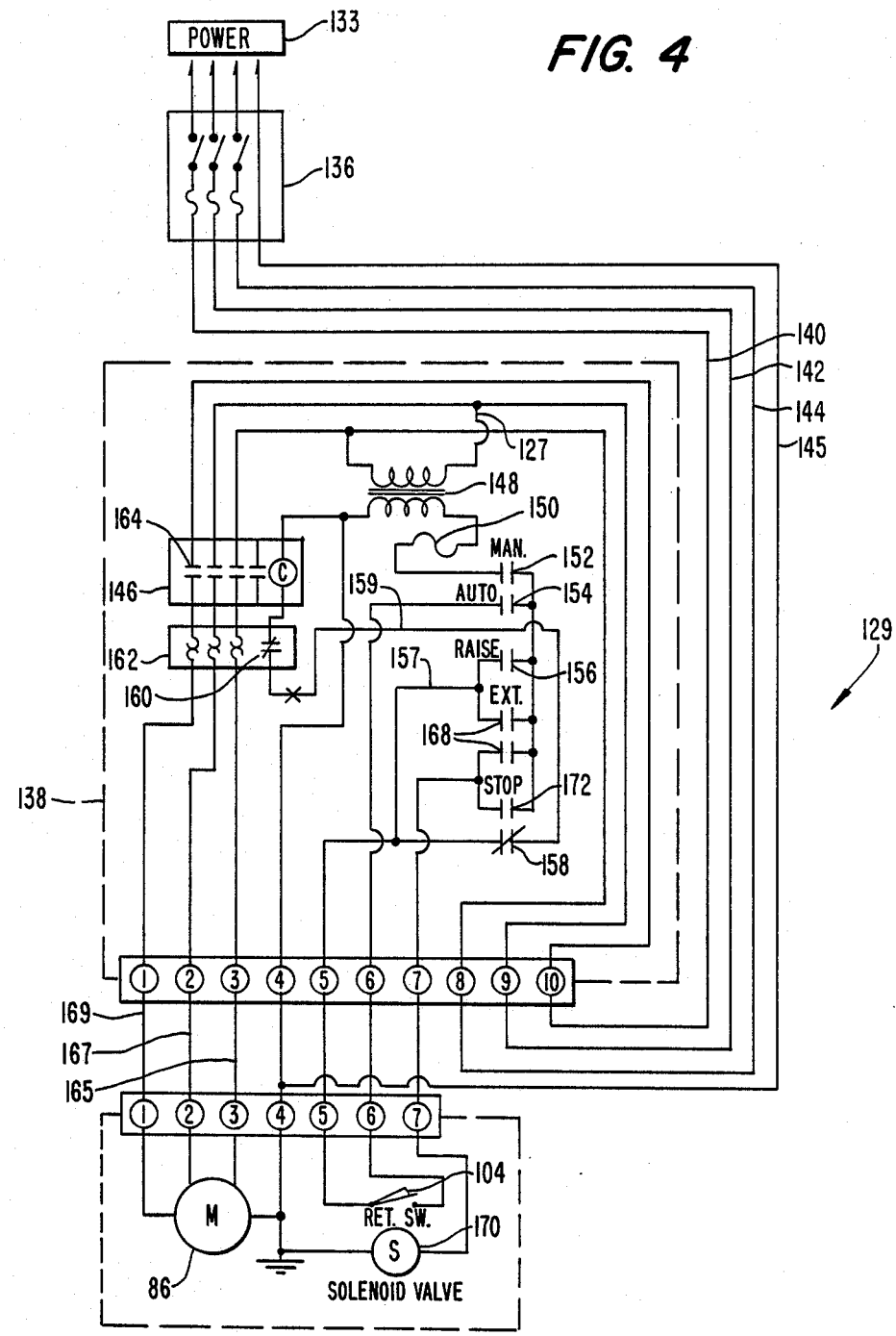
FIG. 4 is a schematic diagram illustrating the electrical circuit of the leveler shown in FIG. 1.

The control system 129 for controlling the operation of dock leveler 10 is shown in FIG. 4. As embodied herein, the control system includes a three phase power source 133, a fuse disconnect 136, and a control box 138. Electrical power is supplied by power source 133 through fuse disconnect 136 and directly enters control box 138 via power lines 140, 142, and 144. Additionally, line 145 acts as a ground for power source 133. In control box 138, power is directly routed to a motor starter 146. Taps on motor starter 146 direct the power via line 127 to control transformer 148 which lowers the voltage to a suitable level such as 24V. A fuse 150 protects all control wiring as well as the control transformer 148 secondary.

A selector switch (not shown) is provided which preferably consists of a three position maintained contact type lever switch with the following logic. A position "off" wherein the manual set of contacts 152 and the automatic set of contacts 154 are open. In the "off" position, dock leveler 10 is inoperative A position "manual" with the manual set of contacts 152 closed. In the "manual position," the control system is not operative to the second condition. A position "automatic" with both the manual set of contacts 152 and automatic set of contacts 154 closed. In the "automatic" position, all operational modes of dock leveler 10 are operable. Selector switch must be in either the "manual" or "automatic" positions to operate pump motor 86.

As embodied herein, the control system of dock leveler 10 further includes an extend switch having a pair of normally open contacts 168 and a push button operator (not shown). Pushing the extend switch closes both pairs of contacts 168 and energizes a solenoid valve 170. This permits simultaneous operation of motor 86 and solenoid valve 170.

As embodied herein, the control system of dock leveler 10 further includes a stop switch having one pair of normally open contacts 172 and a pair of normally closed contacts 158. Depressing the stop switch energizes solenoid valve 170 and breaks the circuit to the motor starter coil due to the opening of the normally closed contact 158.

As embodied herein, the control system of dock leveler 10 includes first switch means for energizing and operating the control means to the first condition. The first switch means includes a raise switch (not shown) which preferably is a momentary contact push button with normally open contacts 156. Depressing the raise switch closes contacts 156 allowing current to pass via lines 157 and 159 through normally closed contacts 158 in a stop switch (not shown) and also pass through a normally closed contact 160 in an overload relay 162 to the coil (not shown) of motor starter 146. This closes motor starter contacts 164 and allows current to flow through overload relay 162 to motor 86 via lines 165, 167, and 169. Should an overload occur at any time, the normally closed contact 160 in the overload relay 162 will open and break the motor starter coil circuit thereby preventing current flow to motor 86.

As embodied herein, the control system still further includes a second switch means responsive to the downward pivotal movement of the lip member from the bridging position for energizing and operating the control system to the second condition. The second switch means includes switch 104 having a first condition (open) illustrated in FIG. 4 and a second condition (not shown) wherein switch 104 is closed. Switch 104 will energize and operate the control system to the second condition when it is in a second closed condition and the automatic contacts 154 of selector switch (not shown) are closed.

In order to obtain a better understanding of the present invention, the electrical and hydraulic operation of a preferred embodiment of the present invention will now be described in detail in connection with the operation of dock leveler 10.

First, a dock leveler cycling operation will be described, i.e., the operation of dock leveler 10 in moving from a stored position shown by dotted lines FIG. 2 to the bridging position shown by solid lines in FIG. 2. The position of dock leveler 10 during a portion of the cycling sequence of operation is illustrated in FIG. 10. Selector switch (not shown) is moved to the "automatic" position closing both the manual and automatic contacts 152, 154, respectively. The raise switch is manually depressed and held in a depressed condition to close contacts 156 and operate motor 86. Electric pump motor 86 drives hydraulic pump 84 drawing fluid via line 83 from reservoir 80 through fitter 82. Pressure from pump 84 shifts shuttle valve 90 to the right hand position permitting fluid to flow unrestricted via lines 85, 87, and 89 through port 94 to both rod and blind ends 62, 60, respectively, of main hydraulic cylinder 54. Fluid to blind end 56 free flows through line 91 past check valve 52. This differentially extends main cylinder 54. Fluid from rod end 58 of main cylinder 54 flows out of port 62 through line 91 past check valve 52 back into blind end 56 through port 60.

As main hydraulic cylinder 54 is extending, fluid flow into lip cylinder 72 is restricted by needle valve 68. Fluid already contained in the blind end 75 of lip cylinder 72 will flow via lines 93 and 97 through port 100, primary sequence valve 92, and secondary relief valve 98 into reservoir 80. This will simultaneously retract lip cylinder 72 and differentially extend main cylinder 54. After lip cylinder 72 is fully retracted and main cylinder 54 is fully extended (FIG. 10), fluid pressure in the system will exceed the pressure setting of primary sequence valve 92 and will shift primary sequence valve 92 to the right hand position permitting fluid to flow via line 93 through port 100 into the blind end 75 of lip cylinder 72 to extend lip cylinder 72. Fluid from the rod end 77 of lip cylinder 72 will free flow via lines 95, 89, 87, and 93 through check valve 70, port 94 and through primary sequence valve 92 back into the blind end 75 of lip cylinder 72.

After both lip cylinder 72 and main cylinder 54 are fully extended (FIG. 10), fluid pressure in the system will exceed the pressure setting of primary relief valve 88 allowing fluid to flow to reservoir 80 via lines 97 and 99. Electric pump motor 86 is then de-energized by releasing the raise switch and opening contacts 156. At this point, main cylinder 54 is fully extended and the second edge 34 of main deck 22 will be above the carrier bed. Lip cylinder 72 will also be fully extended and lip member 36 will be substantially co-planar to the main deck 22. The pressure immediately above the hydraulic pump 84 in line 83 drops essentially to zero when pump 84 stops pumping. This causes shuttle valve 90 to shift to the left hand position shown in FIG. 2 by dotted lines and fluid begins to backflow from the blind end 56 of main cylinder 54 through line 91 across needle valve 50. The pressure induced across needle valve 50 causes pressure in pilot line 51 and pilot port 200 which holds secondary sequence valve 96 closed. All valves will be in the position shown in FIG. 4 except for secondary sequence valve 96 which is held closed by pressure on the blind end of main cylinder 54. This pressure is derived from the weight of main deck 22 and is induced from the pressure drop across needle valve 50 relative to the pressure at port 94. The pressure drop across needle valve 50 is a result of a controlled flow of fluid through line 91 across needle valve 50 due to downward movement of main deck 22. The main deck 22 will continue to move downward until lip member 36 rests on the bed of a carrier 26 as shown by solid lines in FIG. 2. Lip member 36 is held out hydraulically because secondary sequence valve 96 is closed. Therefore, lip member 36 stays fully extended while main deck 22 is dropping at a controlled rate. Once lip member 36 engages a carrier bed, the fluid flow in line 91 across needle valve 50 ceases. Dock leveler 10 is now in a bridging position between a loading dock and a carrier bed (shown by solid lines in FIG. 2)

Now, a dock leveler recycling operation according to a preferred embodiment of the present invention will be described, i.e., the operation of a dock leveler in moving from a bridging position shown by solid lines in FIG. 2 to a stored position shown by dotted lines in FIG. 2. The position of dock leveler 10 during a portion of the recycling sequence of operation is illustrated in FIG. 11. A recycling operation is initiated when the carrier whose bed 26 lip member 36 is supported upon departs. Lip member 36 is held out hydraulically by closed secondary sequence valve 96 and main deck 22 begins to descend by gravity at a controlled rate. The rate of descent is controlled by the aperture of needle valve 50. Once main deck cylinder 54 is fully retracted and main deck 22 is at its lowest position (FIG. 11), the fluid flow in line 91 across needle valve 50 ceases and the pressure in pilot line 51 and pilot port 200 which has held secondary sequence valve 96 closed drops essentially to zero. Consequently, secondary sequence valve 96 opens and lip member 36 begins to pivot downward relative to the plane of main deck 22 due to the force of gravity.

Lip member 36 in its fully extended bridging position is approximately 8° below the plane of main deck 22. Once lip member falls a total of approximately 15° from the plane of main deck 22 (shown in FIG. 6), the free end 130 of cam member 126 engages the free end 124 of operating arm 120 and pivots operating arm 120 in the counterclockwise direction. Movement of operating arm 120 in the counterclockwise direction closes switch 104 This energizes motor 86 and hydraulic pump 84 begins drawing fluid from reservoir 80 through line 83 and pumping fluid through the system to extend main cylinder 54 and retract lip cylinder 72 (hydraulic fluid will follow the same path described in the cycling operation). The rate that lip cylinder 72 is retracted depends on the orifice of needle valve 68. Fluid is pumped through port 94 and free flows through check valve 52 to enter the blind end 56 of main cylinder 54 through inlet port 60 This extends main cylinder 54 and raises main deck 22. Simultaneously, fluid flows through needle valve 68 via line 95 and enters the rod end 77 of lip cylinder 72. As a result, fluid is pushed out of blind end 75 of lip cylinder 72 via line 93 through port 100, through primary sequence valve 92, through secondary relief valve 98 and into reservoir 80. Lip cylinder 72 is therefore hydraulically retracted while main cylinder 54 is hydraulically extended.

Lip member 36 which is being retracted to extend substantially normal to main deck 22 in the stored position cannot be fully retracted until main deck 22 is raised a sufficient distance so that the second end 35 of lip member 36 clears keepers 42 on the second end 20 of frame 17. Then, lip member 36 will be completely retracted (see FIG. 9) and the free end 124 of operating arm 120 will roll off the free end 130 of cam 126 and return to its neutral position. This will move switch 104 to its open condition and de-energize pump motor 86. Main deck 22 will then descend by gravity at a rate controlled by the aperture of needle valve 50. Subsequently, pressure in line 83 just above pump 84 will drop essentially to zero and fluid will backflow out of the blind end 56 of main cylinder 54 through line 91 across needle valve 50. As the main deck 22 descends, the second edge 35 of lip member 36 will come to rest in keepers 42 to halt the descent of and support main deck 22. By design, the surface of main deck 22 is substantially level or co-planar with loading dock platform 19 when lip member 36 is engaged in keepers 42.

According to a preferred embodiment of the present invention, the cycling operation previously described can be accomplished by energizing solenoid valve 170 once the second end 35 of lip member 36 clears the bed of the carrier 26. Solenoid valve 170 is energized by pushing the extend switch (not shown) which closes the pair of contacts 168. This feature allows simultaneous operation of pump motor 86 and solenoid valve 170.

When solenoid valve 170 is energized, it will simulate a fully extended main cylinder 54. Solenoid valve 170 is a normally open, spool-type, two-way valve which will block fluid flow through line 91 to blind end 56 of main cylinder 54 when energized. This blockage of line 91 causes a pressure build-up in lines 89 and 87. This fluid pressure will exceed the pressure setting of primary sequence valve 92 and shift primary sequence valve 92 to the right hand position permitting fluid to flow via line 93 through port 100 into the blind end 75 of lip cylinder 72. From this point forward, the cycling sequence of events is identical to that previously described (except that the extend switch must be released to de-energize pump motor 86).

The use of solenoid valve 170 reduces the amount of time it takes to cycle dock leveler 10. Upward movement of main deck 22 can be halted and lip member 36 can be extended to its bridging position without it being necessary for main cylinder 54 to fully extend. Also, since main cylinder 54 is not fully extended, main deck 22 will descend through a shorter distance than it would had main cylinder 54 been fully extended.

The use of solenoid valve 170 can also facilitate an operation wherein lip member 36, which normally overlaps approximately the rear twelve inches of a carrier bed in a bridging position, can be power retracted to allow a forklift truck to load a carrier bed to its most rearward point (including the twelve inches a lip member would normally occupy). Such an operation is achieved by depressing the raise switch when lip member 36 is in the bridging position shown by solid lines in FIG. 2. Pressing the raise switch closes contacts 156 which as described previously will energize motor 86 to operate pump 84. Fluid will flow through the system as described previously to extend main cylinder 54 and simultaneously retract lip cylinder 72 One main deck 22 is raised approximately eighteen inches (so that the second end 35 of lip member 36 will clear the carrier bed 26 during pivoting to its stored position), the extend button is pushed which closes the pair of contacts 168 to energize the solenoid and simulate a fully extended main cylinder 54. Fluid flow through line 91 will be blocked and all fluid flowing through port 94 will flow via line 95 through needle valve 68 into the rod end 77 of lip cylinder 72. This will power retract lip cylinder 72 completely before the pressure in lines 95, 89 and 87 will build up to exceed the pressure setting of primary sequence valve 92. Once lip member 36 is fully retracted the extend switch is released which de-energizes motor 86. As described previously, main deck 22 will descend at a controlled rate until the second end 35 of lip member 36 engages keepers 42 halting the descent of and supporting main deck 22. If carrier bed 26 is above the height of loading dock platform 19, a directly adjacent the most rearward end of carried bed 26. If carrier bed 26 is below the height of loading dock platform 19, the raise switch is depressed to raise main deck 22 until the second end 35 of lip member 36 raises above keepers 42.

Then, the extend switch is pressed which will extend lip member 36 to pivot outwardly from the second end 20 of frame 17. Next, the extend switch is released and main deck 22 descends and will come to rest at its lowest level on frame 17. Lip member 36 will not engage keepers 42 during the descent of main deck 22 to its lowest level because it has been pivoted outwardly by operation of the extend switch. A forklift can then move across main deck 22 and place an end load directly adjacent the most rearward end of carrier bed 26.

It will be apparent to those skilled in the art that various modifications and variations can be made in the dock leveler of the present invention without departing from the scope or spirit of the present invention. Thus, it is intended that the present invention cover the modifications and variations of the invention which come within the scope of the appended claims or their equivalents.

What is claimed is:

1. A hydraulic dock leveler for bridging a gap between a loading dock platform and a carrier bed, comprising:
   a frame having a first end to be disposed adjacent a loading dock platform and a second opposite end spaced outwardly from said first end;
   a main deck having first and second edges, said first edge pivotably connected to said first end of said frame for
   pivoting said main deck relative to the plane of the loading dock platform for positioning said second edge of said main deck at a selected height relative to the loading dock platform;
   a lip member having first and second opposite edges, said first edge of said lip member pivotably connected to said second edge of said main deck for pivoting said lip member between a bridging position for engaging the carrier bed and a stored position for supporting said main deck at a selected level relative to the loading dock platform;
   hydraulic means for pivotably positioning said main deck relative to the loading dock platform and to pivot said lip member between said bridging position and said stored positions, said hydraulic means operative to hydraulically retract said lip member from said bridging position to said stored position, said hydraulic means including a normally open, piloted-to-closed two-way spool valve for hydraulically holding the lip member in the bridging position; and
   control means for operating said hydraulic means.

2. The hydraulic dock leveler as recited in claim 1, wherein the hydraulic means includes safety valve means for allowing pivotal movement of the lip member from the bridging position toward the stored position at times when said lip member is impacted by a truck.

3. The hydraulic dock leveler as recited in claim 1, wherein the valve means is moved to and held in a closed condition by pilot pressure created by the downward movement of the main deck relative to the loading dock.

4. The hydraulic dock leveler as recited in claim 3, wherein the valve means opens when the main deck descends to its lowest position relative to the loading dock platform.

5. The hydraulic dock leveler as recited in claim 1, wherein the lip member forms an angle less than 90° with the main deck at times when said lip member is in the stored position.

6. The hydraulic dock leveler as recited in claim 1, wherein the control means operates the hydraulic means to raise the main deck and power retract the lip member from the bridging position to the stored position for supporting the second edge of the main deck at a selected level relative to the adjacent loading dock.

7. The hydraulic dock leveler as recited in claim 1, wherein the hydraulic means includes a main cylinder assembly for pivoting the main deck relative to the loading dock platform, a lip cylinder assembly for hydraulically pivoting the lip member relative to the main deck, and a hydraulic system for operating said main and lip cylinder assemblies.

8. The hydraulic dock leveler as recited in claim 7, wherein the main and lip cylinder assemblies include double acting main and lip hydraulic cylinders, respectively.

9. The hydraulic dock leveler as recited in claim 8, wherein the hydraulic system is operative for simultaneously extending the main cylinder and retracting the lip cylinder.

10. The hydraulic dock leveler as recited in claim 9, wherein the lip cylinder assembly includes needle valve means so that the lip cylinder can be retracted at a selected rate.

11. The hydraulic dock leveler as recited in claim 8, wherein the hydraulic system is operative to fully extend the main cylinder before extending the lip cylinder.

12. The hydraulic dock leveler as recited in claim 11, wherein the control means includes means for simulating a fully extended main cylinder to operate the hydraulic system to extend the lip cylinder without the main cylinder being fully extended.

13. The hydraulic dock leveler as recited in claim 12, wherein the means for simulating includes a solenoid valve.

14. A hydraulic system for a dock leveler which acts as a bridge between a loading dock platform and a carrier bed, the dock leveler having a pivotably positionable main deck and a pivotably positionable lip member, the hydraulic system comprising:
    a main cylinder assembly for pivoting the main deck relative to the loading dock platform;
    a lip cylinder assembly for pivoting the lip member between a bridging position and a stored position; and
    hydraulic means for operating said main and lip cylinder assemblies, said hydraulic means operative to power extend and power retract said lip cylinder assembly, said hydraulic means including a normally open, piloted-to-close two-way spool valve for hydraulically holding the lip cylinder in a fully extended condition.

15. The hydraulic system as recited in claim 14, wherein the main and lip cylinder assemblies include main and lip double acting hydraulic cylinders, respectively, and the hydraulic means is operative to simultaneously extend said main cylinder and retract said lip cylinder.

16. The hydraulic system as recited in claim 14, wherein the valve means is moved to and held in a closed condition by pilot pressure created by the downward movement of the main deck relative to the loading dock platform.

17. The hydraulic system as recited in claim 16, wherein the valve means opens when the main deck descends to its lowest level relative to the loading dock platform.

* * * * *